US012491524B2

(12) United States Patent
Hacibekir et al.

(10) Patent No.: US 12,491,524 B2
(45) Date of Patent: Dec. 9, 2025

(54) FLUID ATOMIZER

(71) Applicants: FORD OTOMOTIV SANAYI A.S., Istanbul (TR); OZYEGIN UNIVERSITESI, Istanbul (TR)

(72) Inventors: Tahsin Hacibekir, Istanbul (TR); Ismail Hakki Savci, Istanbul (TR); Ozan Ekin Nural, Istanbul (TR); Ozkan Bebek, Istanbul (TR); Ozgur Ertunc, Istanbul (TR)

(73) Assignees: FORD OTOMOTIV SANAYI A.S., Istanbul (TR); OZYEGIN UNIVERSITESI, Istanbul (TR)

( * ) Notice: Subject to any disclaimer, the term of this patent is extended or adjusted under 35 U.S.C. 154(b) by 439 days.

(21) Appl. No.: 17/922,000

(22) PCT Filed: Apr. 27, 2021

(86) PCT No.: PCT/TR2021/050399

§ 371 (c)(1),
(2) Date: Oct. 28, 2022

(87) PCT Pub. No.: WO2021/221593

PCT Pub. Date: Nov. 4, 2021

(65) Prior Publication Data

US 2023/0166275 A1 Jun. 1, 2023

(30) Foreign Application Priority Data

Apr. 28, 2020 (TR) ................................ 2020/06619

(51) Int. Cl.
*B05B 1/34* (2006.01)
*B05B 1/06* (2006.01)

(52) U.S. Cl.
CPC ............. *B05B 1/3426* (2013.01); *B05B 1/06* (2013.01); *B05B 1/3489* (2013.01)

(58) Field of Classification Search
CPC ....... B05B 1/3426; B05B 1/06; B05B 1/3489; B05B 1/34; F02M 39/00; F02M 61/162;
(Continued)

(56) References Cited

U.S. PATENT DOCUMENTS 1,518,449 A 12/1924 Plantinga
2013/0221135 A1 8/2013 Myers et al.
(Continued)

FOREIGN PATENT DOCUMENTS

CN 101737218 A 6/2010
CN 102019242 A 4/2011
(Continued)

*Primary Examiner* — Mark A Laurenzi
*Assistant Examiner* — Kelsey L Stanek
(74) *Attorney, Agent, or Firm* — Bayramoglu Law Offices LLC

(57) ABSTRACT

A fluid atomizer is provided, and the fluid atomizer is used to atomize the fluid into a spray of droplets, and transform the fluid into spray dispersion in the form of intertwined inner conical film and outer conical film layer by atomizing the fluid. The fluid atomizer includes a plurality of inlet channels, at least one swirl chamber, at least one contracting channel, at least one flow passage channel, at least one internal outlet channel, at least one external outlet channel, and at least one channel holder.

20 Claims, 5 Drawing Sheets

(58) Field of Classification Search
CPC .... F02M 25/0225; F02M 61/02; F02M 67/10; F23R 3/10; F01N 3/36; F01N 2610/02; F01N 2610/03; F01N 2610/1453
USPC .................................... 239/463; 60/272–324
See application file for complete search history.

(56) References Cited

U.S. PATENT DOCUMENTS

| | | | | |
|---|---|---|---|---|
| 2016/0084503 | A1 | 3/2016 | Hawie et al. | |
| 2020/0261929 | A1* | 8/2020 | Mickos | B05B 1/12 |

FOREIGN PATENT DOCUMENTS

| | | | |
|---|---|---|---|
| CN | 103134079 | B | 12/2014 |
| DE | 20004206 | U1 | 5/2000 |
| EP | 1090256 | A1 | 4/2001 |
| EP | 2312069 | A2 | 4/2011 |
| WO | 2018099969 | A1 | 6/2018 |
| WO | 2019195043 | A1 | 10/2019 |

* cited by examiner

FLUID ATOMIZER

CROSS REFERENCE TO THE RELATED APPLICATIONS

This application is the national phase entry of International Application No. PCT/TR2021/050399, filed on Apr. 27, 2021, which is based upon and claims priority to Turkish Patent Application No. 2020/06619, filed on Apr. 28, 2020, the entire contents of which are incorporated herein by reference.

TECHNICAL FIELD

The present invention relates to a fluid atomizer (pressure swirl atomizer), which is used to atomize the fluid in liquid form into a spray of droplets, and transform the same into a spray dispersion in the form of intertwined inner conical film and outer conical film layer by atomizing the fluid.

BACKGROUND

Atomizers are used to atomize the fluid into a spray of droplets. Sprays are used in many technological and ready-made products such as internal combustion engines, jet engines, rocket engines, cleaning systems of exhaust gas, painting systems, surface coatings, pharmaceutical applications, perfume applications. Pressure swirl atomizers create a hollow conical fluid film at the exit of the atomizer and then a hollow conical spray with the atomizing of this film by pushing the fluid inside and outside the atomizer from the center outwards with the swirl they create in the swirl chamber.

Pressure swirl atomizers preferably give the fluid swirling movement and transform the same into the form of a spray. In standard pressure swirl atomizers, the center of the spray formed as a single cone is empty and particularly in coating and high flow spray applications, it does not have homogenous droplet dispersion in the volume or surface where it is applied. Jet atomizers are used for full homogeneous sprays, but these atomizers require very high pressure at high flow rates. At the same pressure, pressure swirl atomizers produce a spray of smaller droplets. An atomizer, which increases radial homogeneity at high flow rate, keeps the pressure requirement low, but also produces a spray of small droplets is obtained with the present application.

Applications that produce spray, where the spray is produced with atomizer sprayers operate by producing spray (jet atomizer) or by producing a hollow conical form spray (pressure swirl atomizer, pintle type atomizer, etc.).

Jet type atomizers pass less flow at the same pressure. Meanwhile, the drop size in jet type atomizers is larger compared to the pressure swirl atomizers. When the spray is preferred to be produced in a more homogenous manner, jet type atomizers that require more pressure and produce large drops are required. In the state of the art, also gaseous systems are used in which air is directed immediately onto the film exiting the atomizer to reduce the droplets. However, this situation causes the atomizer systems to become more complex.

There is a fuel supply injector using a plurality of injectors in the state of the art, in Chinese patent document numbered CN101737218 (A) and dated 19 Jan. 2019. In this study contained in said document, it is aimed to feed the fluid by opening a thread on the valve stem and to create a spray with a wider angle with the fluid coming from the edge line. High atomization at low pressure has been achieved with this internal design. In said patent document, it has been tried to obtain swirling flow with the valve. A hollow spray can be obtained, (it is explicit in FIG. 5 in the document) with said invention. Said document is completely different from the present application. It is aimed to create a rotary flow with the valve and it is seen that a hollow spray is obtained in said document. The liquid fluid is transformed into a spray structure forming two conical films in the present application In Chinese patent document in the state of the art numbered CN102019242 (A) with priority date 1 Nov. 2010, there is a snow generating spray nozzle. Said invention is an atomizer defined as airblast atomizer. An internal channel is used for air passage in the injector with an inner and outer inlet in said document. Water flow is provided with a flange angle of 45 degrees and spray formation is realized with air. The use of the injector for snow production is provided by blowing air through the internal channel in said document. On one hand, gas and liquid are sprayed together in the atomizer for snow production in said document, on the other hand only liquid is sprayed in the present application. Moreover, the fluid is atomized in conical form by passing through the channels in the center of the fluid atomizer in the present application.

In the Chinese patent document numbered CN103134079 (B) and priority dated 30 Nov. 2011 included in the state of the art, an injector design is described. Double fluid outlet is used and explained in said document. The present application is for single fluid use. It is aimed to create a spray at a wide cone angle (increased conical spray angle from 10 degrees to 15 degrees) with the fluid outlet located on both sides and to create a more homogeneous spray. The fluid is passed through the internal and external channels in the center of the swirl chamber and is atomized and a conical spray is obtained in the present application.

The double cone pressure swirl atomizer in the invention subject to application is specified as a new type of pressure fluid atomizer. There are two fluid outlets in the inventive fluid atomizers forming two intertwined conical films. A slotted channel is attached to the center of the atomizer subject to application. At the same time, two channels are used inside and outside of said atomizer. Thus, homogeneous spray application at high flow rate and low pressure can be provided with the fluid atomizer described in the present application.

In the state of the art, there is no explanation regarding the technical features and the technical effects provided by the invention of the present application. A fluid atomizer which forms two intertwined conical films, to the center of which a perforated channel is attached, in which two channels inside and outside are used in the atomizer and with which a homogenous spray application at high flow and low pressure is achieved, is not encountered in the existing applications.

SUMMARY

The aim of this invention is to realize a fluid atomizer that enables the liquid flowing by rotating through the inner and outer channels to come out by forming a flow in the form of an intertwined conical film.

Another aim of the present invention is to provide a fluid atomizer that provides homogeneous spray application at high flow and low pressure.

Another aim of the present invention is to realize a fluid atomizer that draws the air in the external environment from the internal outlet channel by making use of the low pressure formed in the swirl chamber and then formed in the contracting channel.

Another aim of the invention is to realize a fluid atomizer that allows the swirling fluid in the swirl chamber to be separated into two parts and forms two intertwined conical liquid films and then forms a spray.

Another aim of the present invention is to provide a fluid atomizer used in chemical reaction applications where the atomizers used in aircraft and rocket injectors, cooling and paint/coating systems, in other words, homogeneous distribution and mixing of spray liquid with ambient gas are important.

A fluid atomizer as defined in the first claim and the other dependent claims, in order to achieve the aim of this invention, consists of inlet channel, swirl chamber, contracting channel, flow passage channel, internal outlet channel, external outlet channel and channel holder. There are multiple inlet channels at different angles to one another in the fluid atomizer. First of all, the fluid (liquid) is transferred to the inlet channels in a pressurized form. The fluid transferred to the inlet channels is transferred to the swirl chamber by passing through the inlet openings. The inlet openings in the inlet channels allow the fluid to flow into the swirl chamber at a tangential or preferred angle, and thus a swirling flow occurs. The inlet openings that allow the fluid to flow into the swirl chamber at a tangential or preferred angle so as to form a swirl can be configured tangentially or at a preferred angle. The fluid that enters the swirl chamber form a swirling around the channel holder located in the center of the swirl chamber. The fluid in the swirl chamber rotates and forms swirl by rotating due to inlet angle after it enters through the inlet openings. The fluid can enter the inlet with pressure or with normal pressure. In the swirl chamber, the fluid is directed to the contracting channel with the swirling formed around the channel holder. The fluid passing from the swirl chamber to the contracting channel accelerates due to the narrowing structure of the contracting channel. The fluid passing into the shrink chamber starts to rotate faster around the central axis of the atomizer. The pressure decreases when the fluid rotates faster in the contracting channel. Preferably, there is a flow passage channel inside the contracting channel. There are internal outlet and external outlet channels in the flow passage channel. Some of the fluid in the swirl chamber and contracting channel enters the internal outlet channel from the internal outlet channel inlet. It is realized that the other part of the fluid coming from the contracting channel that does not go to the internal outlet channel progresses towards the outlet by rotating in the external outlet channel. Low pressure is formed due to the rotation and progress of the fluid in the external outlet channel. The air in the external environment is absorbed through the external outlet channel and the internal outlet channel. When the air is absorbed by the external outlet channel and the internal outlet channel a fluid is formed on the external wall of the external outlet channel and an air layer is formed on the inner wall. Air coming from the external environment can be absorbed with the low pressure zone formed at the internal outlet channel inlet. At the same time, the fluid entering the internal outlet channel through the low pressure zone formed can return and exit from the internal outlet channel outlet. The fluid which flows by rotating in the internal outlet channel rotates about the central axis of the atomizer and exits through the internal outlet channel outlet in the form of conical film layer or atomized droplets. Similarly, the fluid, which rotates in the external outlet channel, rotates in the center axis of the atomizer and exits from the external outlet channel outlet in the form of an external conical film layer or atomized droplets. Therefore, the fluid can be atomized and come out in the form of particles.

BRIEF DESCRIPTION OF THE DRAWINGS

The fluid atomizer realized to achieve the aim of the present invention is shown in the attached figures, in which.

Figure 1:
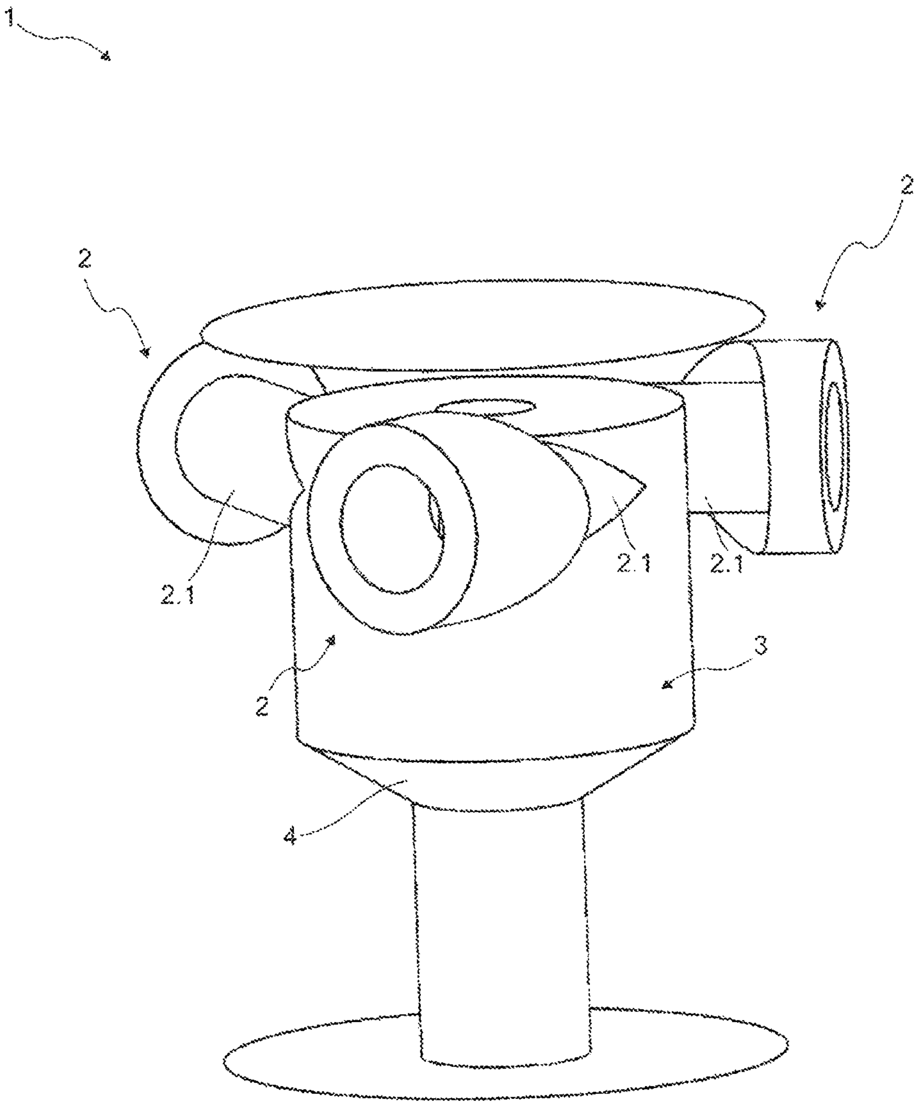
FIG. 1 is a perspective view of the fluid atomizer.
Figure 2:
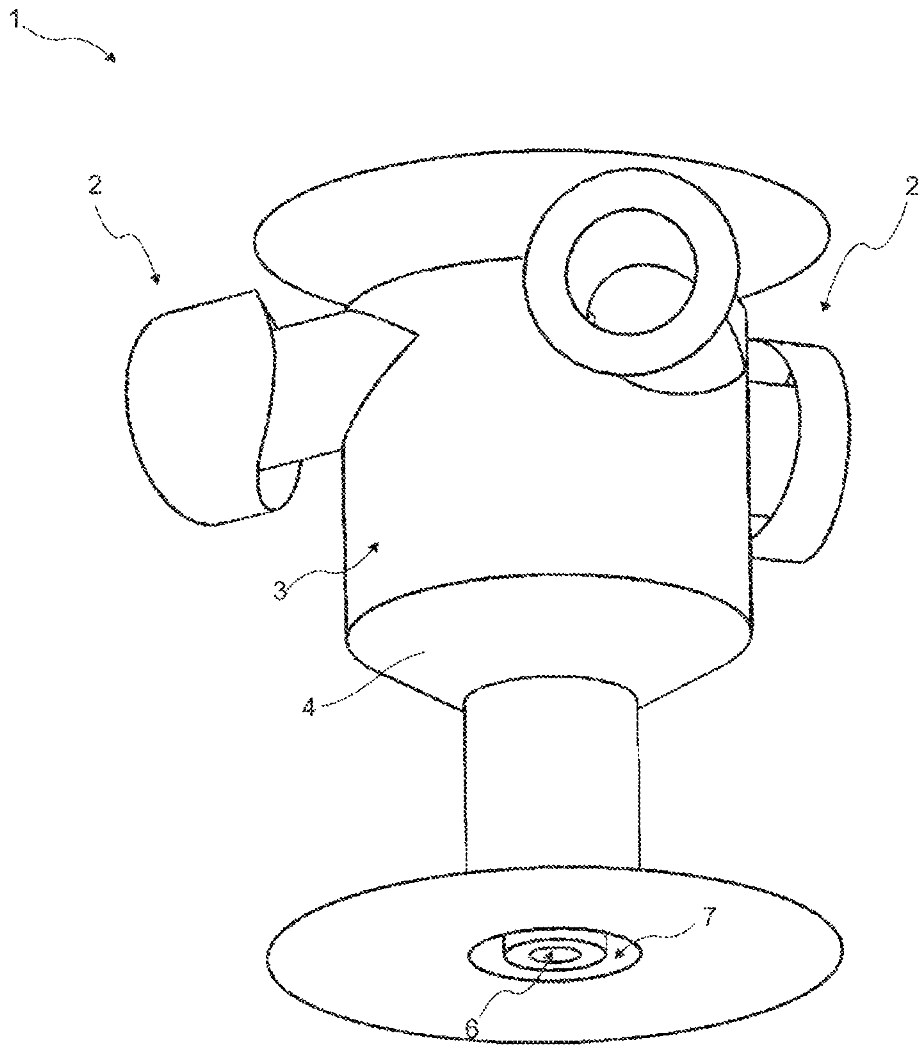
FIG. 2 is a perspective view of the fluid atomizer from another
Figure 3:
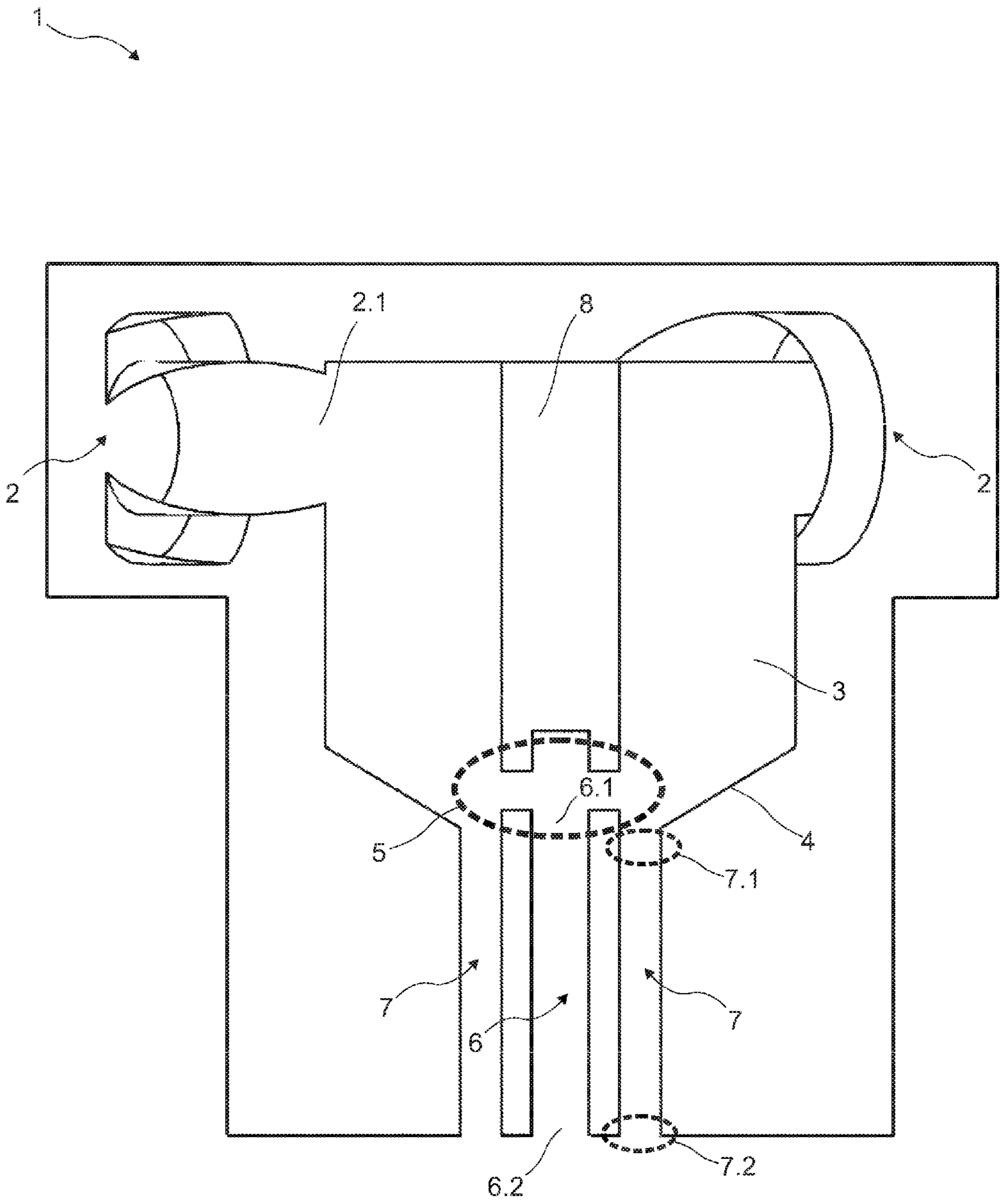
FIG. 3 is a cross-sectional view of the fluid atomizer.
Figure 4:
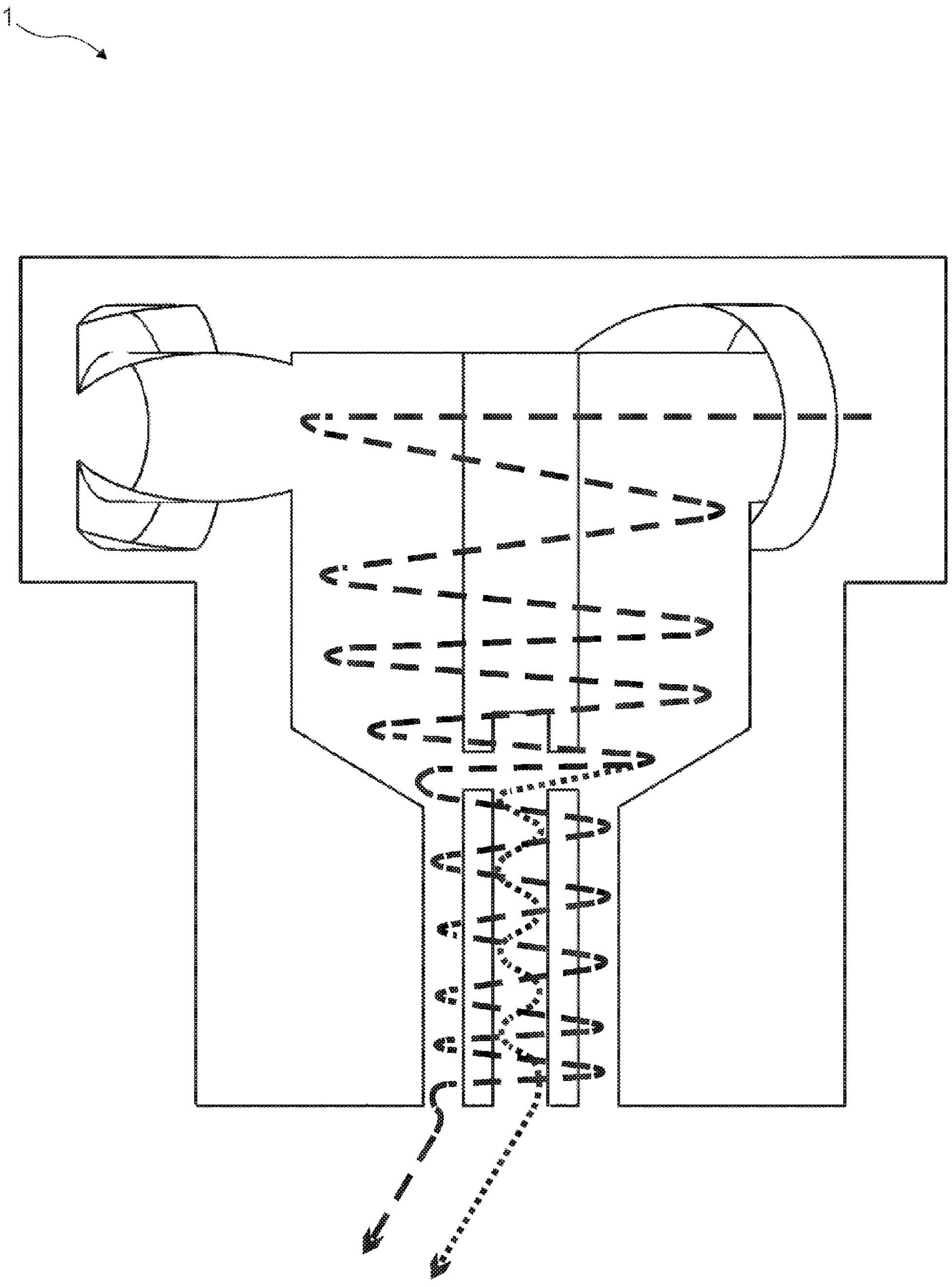
FIG. 4 is a schematic view of the flow process that shows the double cone spray formation in the fluid atomizer.
Figure 5:
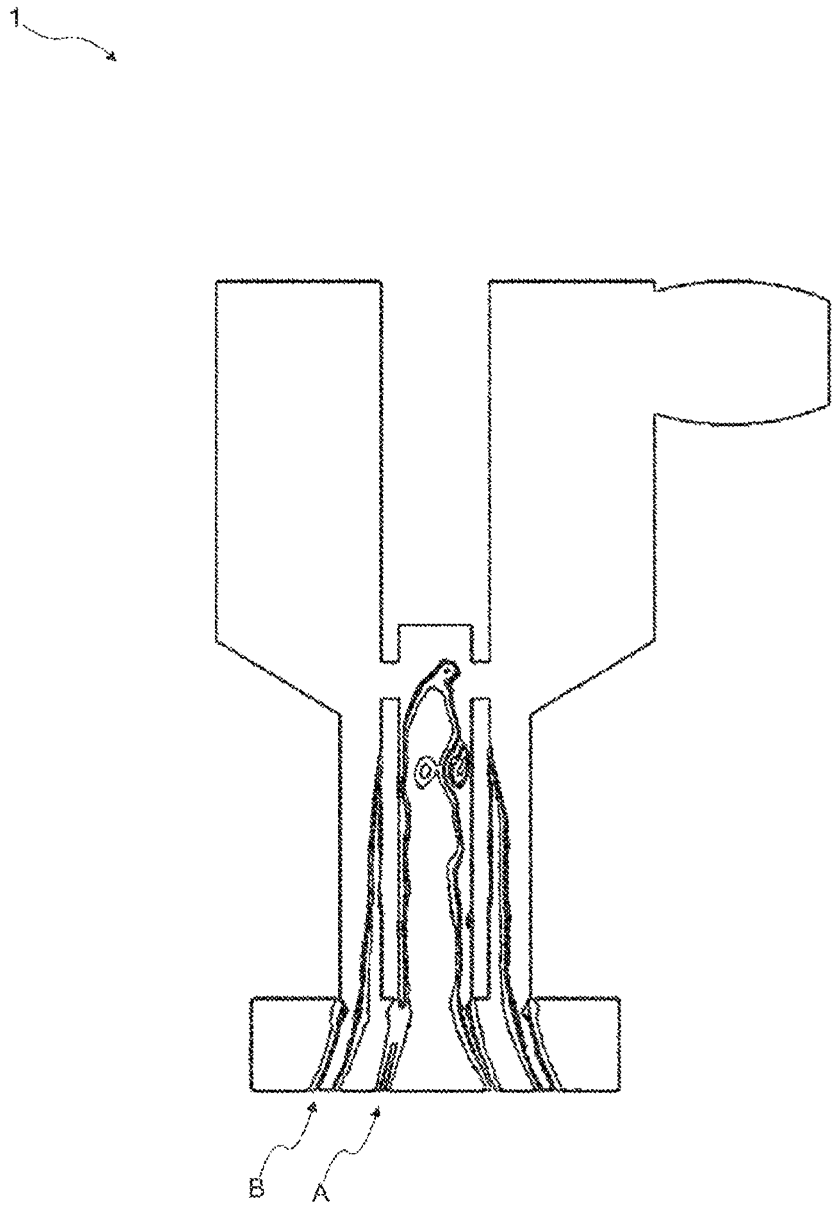
FIG. 5 is a view of the formation of inner conical film and outer conical film in fluid atomizer.

The parts in the figure are enumerated one by one and the parts correspond to these numbers are given in the following.

1. Fluid atomizer
2. Inlet channel
  2.1. Inlet opening
3. Swirl chamber
4. Contracting channel
5. Flow passage channel
6. Internal outlet channel
  6.1. Internal outlet channel inlet
  6.2. Internal outlet channel outlet
7. External outlet channel
  7.1. External outlet channel inlet
  7.2. External outlet channel outlet
8. Channel holder
A. Inner conical film
B. Outer conical film

DETAILED DESCRIPTION OF THE EMBODIMENTS

The fluid atomizer (1), which is used to atomize the fluid into a spray of droplets, and transform the same into spray dispersion in the form of intertwined inner conical film (A) and outer conical film (B) layer by atomizing the fluid, mainly including,

- a plurality of inlet channels (2) that ensure the fluid to be converted into spray form to enter into the swirl chamber (3) at a tangential or preferred angle.
- at least one swirl chamber (3) which has circular form, causes the fluid to enter the fluid inlet (2) at a tangential or preferred angle to create a swirl and directs the swirling fluid to the contracting channel (4),
- at least one contracting channel (4) that is preferably located in the lower part of the swirl chamber (3) and whose diameter is smaller than the diameter of the swirl chamber (3), increases the rotation speed and flow rate of the fluid coming from the swirl chamber (3),
- at least one flow passage channel (5) that is located in the contracting channel (4), enables the fluid coming from the swirl chamber (3) and the contracting channel (4) to be divided and transferred to the internal outlet channel (6) and the external outlet channel (7),
- at least one internal outlet channel (6) that extends downwards starting from the inner section of the contracting channel (4), passes a part of the fluid coming from the flow passage channel (5) by being divided to the external environment by passing through the swirl chamber (3) or through the contracting channel (4) and to external environment and at the same time enables the fluid to be transferred to the external environment by absorbing the air coming from the external environment in the form of a spray in the form of an inner conical film (A) layer, at least one external outlet channel (7) that extends downwards starting from the inner section of the contracting channel (4), has a diameter different from the diameter of the internal outlet channel (6), transfers a part of the fluid coming from the flow passage channel (5) to the external environment by passing through swirl chamber (3) or through the contracting channel (4) and at the same time provides the discharge of the fluid to be transferred to the external environment by absorbing the air coming from the external environment in the form of a spray in the form of an outer conical film (B) layer, at least one channel holder (S) that is located on the central axis of the swirl chamber (3), ensures that the flow passage channel (5) and the internal outlet channel (6) are kept on the center axis of the swirl chamber (3) and the contracting channel (4).

The inventive fluid atomizer (1) is generally used in many technological and ready-made products such as internal combustion engines, jet engines, rocket engines, exhaust gas cleaning systems of cars, painting systems, surface coatings, pharmaceutical applications, perfume applications etc. Specifically, the fluid atomizers (1) can be used in the fuel systems of internal combustion engines or in the exhaust systems. Fluid atomizers (1) can be used in the fuel systems of internal combustion engines or in the exhaust systems so as to burn the fuel better. The fluid atomizer (1) allows the fuel or additives to be mixed into the fuel in the fuel systems or exhaust systems of internal combustion engines to be sprayed to the preferred area in the form of spray. Mixing becomes much more effective and the efficiency of the combustion or mixing process increases depending on the field of use, by spraying the fuel or additive in liquid form to the preferred area in the form of a spray.

In another embodiment of the invention, the fluid atomizers (1) can be used to allow the exhaust emission value to reach the preferred levels in the exhaust systems of internal combustion engines. Fluid similar to Adblue which provides the combustion in the gas exiting the exhaust system or the shrink of the exhaust gas by reacting again before it is discharged, can be sprayed with the fluid atomizer (1).

In a preferred embodiment of the invention, the fluid atomizer (1) includes; inlet channel (2), swirl chamber (3), contracting channel (4), flow passage channel (5), internal outlet channel (6), external outlet channel (7) and channel holder (8). Fluid atomizer (1) is used to atomize the liquid into a spray consisting of droplets by atomizing the same. The fluid atomizer (1) brings the fluid into an intertwined inner conical film (A) and outer conical film (B) layer. Subsequently, these film layers are atomized after leaving the inner outlet (6) and external outlet channel (7) to form a spray consisting of small drops. Thus, burning and mixing of the fluid used as fuel, paint or additive becomes easier and more efficient.

In a preferred embodiment of the invention, the inlet channel (2) ensures the fluid to be converted into spray form to enter into the swirl chamber (3) at a tangential or preferred angle. The inlet channel (3) is connected to the swirl chamber (2). A plurality of inlet channels (2) is connected to the swirl chamber (3). In this embodiment of the invention, three inlet channels (2) are connected to the swirl chamber (3). The inlet channels (2) are fixed in the swirl chamber with a preferred angle or in a preferred angle range. In this embodiment of the present invention, there is a 120 degree angle between the inlet channels (2). The inlet channel (2) preferably includes at least one inlet opening (2.1). The fluid enters the inlet channel (2) preferably in a pressurized manner. In one embodiment of the invention, the inlet opening (2.1) located in the inlet channel (2) is located at the section Where the inlet channels (2) engage with the swirl chamber (3). The inlet openings (2.1) allow the fluid entering through the inlet channels (2) to enter the swirl chamber (3) at a tangential or preferred angle. The inlet openings (2.1) are configured to be connected to the swirl chamber (3) at a tangential or preferred angle so as to allow the fluid to enter the swirl chamber (3) at a tangential or preferred angle. The fluid entering the swirl chamber (3) is required to make a swirling flow in the swirl chamber (3). For this reason, the inlet openings (2.1) are connected to the swirl chamber (3) at an angle. It is ensured that the fluid entering from the inlet openings (2.1) forms a swirling in the swirl chamber (3) by opening the inlet openings (2.1) of the inlet channels (2) to the swirl chamber (3) with a tangential or preferred angle.

In a preferred embodiment of the invention, the swirl chamber (3) is preferably in a circular or cylindrical form. The fluid entering the swirl chamber (3) is provided to move with the swirling flow form by means of the cylindrical form of the swirl chamber (3) and the angled connection of the inlet channels (2). The flow is directed towards the contracting channel within the swirl chamber (3). In this embodiment of the invention, the swirl chamber (3) is preferably in a cylindrical geometric form, there are inlet channels (2) at one end of the cylindrical surface and contracting channel (4) at the other end. Fluid that enters through the inlet channels (2) with high pressure passes through the inlet openings (2.1) and then passes to the swirl chamber (3). There is a channel holder (8) on the central axis of the swirl chamber (3) such that it is on the contracting channel (4). The fluid entering the swirl chamber (3) with high pressure from the inlet openings (2.1) creates a swirling around the channel holder (8) because the inlet openings (2.1) are found at a tangential or preferred angle. The fluid creates a swirling in the swirl chamber (3) in a manner such that it rotates around the central axis of the swirl chamber (3). The fluid entering through the inlet channels (2) in the swirl chamber (3) can form a swirling such that it is tangential to the external wall of the swirl chamber (3) or to the external surface of the channel holder (8) located on the central axis. There is a contracting channel (4) at the lower section of the swirl chamber (3).

In an embodiment of the invention, the contracting channel (4) is preferably found at the lower section of the swirl chamber (3). The diameter of the contracting channel (4) where it joins the external outlet channel (7) is smaller than the diameter of the swirl chamber (3). The contracting channel (4) increases the rotation speed and flow rate of the fluid corning from the swirl chamber (3) in the swirling flow characteristic. The contracting channel (4) is preferably in a conical geometric form. The speed of the swirling fluid in the swirl chamber (3) is provided to be increased during its passage to the contracting channel (4) due to the conical form of the contracting channel (4). The rotation speed of the fluid that passes from the swirl chamber (3) to the contracting channel (4) around the central axis of the contracting channel, (4) increases. The contracting channel (4) provides a decrease in the pressure of the fluid passing through the swirl chamber (3) with high pressure in the swirling flow characteristic. The pressure of the fluid moving with high pressure in the swirl chamber (3) with a large-scale swirling flow characteristic decreases due to the decrease in diameter white the rotation speed in the swirling characteristic increases during the passage to the small diameter contracting channel (4). If the pressure decreases sufficiently, gas flow occurs into the atomizer (1) from the environment where the internal outlet channel (6) and external outlet channels (7) are connected, the cone formed liquid film coming out from these channels becomes thinner.

In an embodiment of the invention, the flow passage channel (5) is located within the contracting channel (4). The flow passage channel (5) enables the fluid coming from the swirl chamber (3) and the contracting channel (4) to be divided and transferred to the internal outlet channel (6) and the external outlet channel (7). The flow passage channel (5) is located between the channel holder (8) and the internal outlet channel (6) and the external outlet channel (7) within the contracting channel (4), The flow passage channel (5) enables the fluid with high rotation and flow velocity at low pressure in the contracting channel (4) to pass from the contracting channel (4) by dividing the same into the internal outlet channel (6) and the external outlet channel (7) of small diameter. The flow passage channel (5) preferably has a plurality of passage lines. In an embodiment of the invention, the flow passage channel (5) has passage lines opening to the contracting channel (4), the internal outlet channel (6) and the external outlet channel (7). The flow passage channel (5) triggers to atomize the fluid coming from the swirl chamber (3) and the contracting channel (4) by dividing the same into a plurality of sections.

In an embodiment of the invention, the internal outlet channel (6) extends downwards starting from the inner section of the contracting channel (4). The internal outlet channel (6) enables the fluid to be transferred to the external environment by passing a part of the fluid coming from the flow passage channel (5) through the swirl chamber (3) or through the contracting channel (4). At the same time, the internal outlet channel (6) ensures that the air coming from the external environment is absorbed and the fluid to be transferred to the external environment comes out in the form of an inner conical film (A) layer. Subsequently this film atomizes and forms the spray. The internal outlet channel (6) is preferably in a cylindrical form at the lower section of the contracting channel (4). There is a plurality of external outlet channels (6) at the lower section of the contracting channel (4). The flow and rotation speeds of the fluid can be increased by extending the internal outlet channel (6) upwards from the interior of the channel holder (8) and towards the interior of the swirl chamber (3). The internal outlet channel (6) preferably includes internal outlet channel inlet (6.1) and internal outlet channel outlet (6.2).

While the internal outlet channel inlet (6.1) opens to the flow passage channel (5), the internal outlet channel outlet (6.2) opens to the external environment or to an operating system (fuel system, exhaust system, etc.) to which the internal outlet channel outlet (6.2) can be connected. While the fluid coming from the internal outlet channel inlet (6.1) of the internal outlet channel (6) enters through the contracting channel (4), gas enters from the external environment through the internal outlet channel outlet (6.2). The internal outlet channel (6) provides that the fluid coming from the contracting channel (4) with a swirling characteristic is directed to the external environment without disturbing the swirling characteristic. The fluid coming from the contracting channel (4) enters the internal outlet channel (6) from the internal outlet channel inlet (6.1), The internal outlet channel (6) is connected to the contracting channel (4) by the flow passage channel (5) at one end and the other end opens to the external environment. The internal outlet channel (6) is connected in the contracting channel (4) by means of the flow passage channel (5) from the internal outlet channel inlet (6.1). The fluid with swirling characteristic entering the internal outlet channel (6) from the internal outlet channel inlet (6.1) rotates and moves towards the internal outlet channel outlet (6.2). When the pressure in the contracting channel (4) is lower than the pressure in the external environment, as pressure of the fluid entering the internal outlet channel (6) decreases, a pressure difference occurs between the internal outlet channel outlet (6.2) and the external environment and the air is ensured to be absorbed from the external environment into the internal outlet channel (6). A fluid layer is formed on the outer wall of the internal outlet channel (6) and an air layer is formed on the inner wall with the absorption of the air corning from the external environment due to the low pressure of the fluid with swirling characteristic entering the internal outlet channel (6) from the internal outlet channel inlet (6.1). The fluid comes out from the internal outlet channel outlet (6.2) preferably in the conical film (A) layer form due to the velocity and pressure difference in the swirling characteristic of the fluid entering the internal outlet channel (6) from the internal outlet channel inlet (6.1) Subsequently this film atomizes and forms the spray. When the fluid moves in the form of a swirl and the air in the external environment is absorbed into the internal outlet channel (6), the internal outlet channel (6) of the fluid transformed into the spray form is pushed towards its outer surface, causing the same to take an inner conical form.

In an embodiment of the invention, the external outlet channel (7) extends downwards starting from the inner section of the contracting channel (4). The external outlet channel (7) has a diameter different from the diameter of the internal outlet channel (6). The external outlet channel (7) enables a part of the fluid coming from the flow passage channel (5) by being divided to be transferred to the external environment by passing through the swirl chamber (3) or through the contracting channel (4). The external outlet channel (7) provides the discharge of the fluid to be transferred to the external environment by absorbing the air coming from the external environment in the form of a spray in the form of an outer conical film (B) layer. There is a plurality of external outlet inlet channels (7) at the lower part of the contracting channel (4). The diameter of the external outlet channel (7) is preferably narrower than the diameter of the internal outlet channel (6). The flow and rotation speeds of the fluid can be increased by extending the external outlet channel (7) upwards from the interior of the channel holder (8) and towards the interior of the swirl chamber (3). The external outlet channel (7) includes external outlet channel inlet (7.1) and external outlet channel outlet (7.2). The external outlet channel (7) is located in such a way that it encircles the internal outlet channel (6). The diameter of the external outlet channel (7) can be equal to the diameter of the internal outlet channel (6), or can be greater or smaller. In an embodiment of the invention, the center axes of the external outlet channel (7) and the internal outlet channel (6) are coincident.

In an embodiment of the invention, while the external outlet channel inlet (7.1) opens to the flow passage channel (5) similar to the internal outlet channel inlet (6.1), the external outlet channel outlet (7.2) opens to the external environment or to an operating system (fuel system, exhaust system, etc.) where the external outlet channel outlet (7.2) can be connected, similar to the internal outlet channel inlet (6.1). While the fluid coming from the external outlet channel inlet (7.1) of the external outlet channel (7) enters through the contracting channel (4), gas enters from the external environment through the external outlet channel outlet (7.2). The external outlet channel (7) provides that the fluid coming from the contracting channel (4) with a swirling characteristic is directed to the external environment without disturbing the swirling characteristic. The fluid coming from the contracting channel (4) is divided in the flow passage channel (5) and enters the external outlet channel (7) from the external outlet channel inlet (7.1). The external outlet channel (7) is connected to the contracting channel (4) by the flow passage channel (5) at one end and the other end opens to the external environment. The external outlet channel (7) is connected in the contracting channel (4) by means of the flow passage channel (5) from the external outlet channel inlet (7.1). The fluid with swirling characteristic entering the external outlet channel (7) from the external outlet channel inlet (7.1) rotates and moves towards the external outlet channel outlet (7.2). The pressure of the fluid entering the external outlet channel (7) of small diameter from the contracting channel (4) decreases. The air coming from the external outlet channel outlet (7.2) can be absorbed when the pressure of the fluid entering the external outlet channel (7) decreases. A fluid layer is formed on the outer wall of the external outlet channel (7) and an air layer is formed on the inner wall with the decrease in the pressure of the fluid with swirling characteristic entering the external outlet channel (7) from the external outlet channel inlet (7.1) and with the absorption of the air coming from the external environment. The fluid with swirling characteristics entering the external outlet channel (7) from the external outlet channel inlet (7.1) exits from the external outlet channel outlet (7.2) in the form of an outer conical film (B) layer or as a spray of atomized droplets.

In one embodiment of the invention, the channel holder (8) is located at the central axis of the swirl chamber (3). The channel holder (8) ensures that flow passage channel (5) and the internal outlet channel (6) are kept on the central axis of the swirl chamber (3) and the contracting channel (4). The channel holder (8) is preferably located at the upper section of the flow passage channel (5) within the swirl chamber (3). The channel holder (8) can be found in different geometric forms. In an embodiment of the invention, the channel holder (8) is in a cylindrical geometric form. The fluid entering with high pressure from the inlet channels (2) makes rotational movement in the swirl chamber (3) with swirling flow characteristic, in a tangential position to the channel holder (8) or around the channel holder (8). The channel holder (8) provides that the flow passage channel (5) remains in a fixed position within the contracting channel (4) on the internal outlet channel (6) and the external outlet channel (7). At the same time, the channel holder (8) ensures that the flow passage channel (5) remains concentrically together with the internal outlet channel (6) and the external outlet channel (7).

In an embodiment of the invention, usage of fluid atomizer (1) included is realized as follows. There are three inlet channels (2) at different angles to each other in the fluid atomizer (1). First of all, the fluid (liquid) is transferred to the inlet channels (2) in a pressurized form. Fluid transferred to inlet channels (2) passes through the inlet openings (2.1) and then passes to the swirl chamber (3). The inlet openings (2) located in the inlet channels (2.1) allow the fluid to flow at a tangential or preferred angle so as to create a swirling after entering the swirl chamber (3). The inlet openings (2.1) that allow the fluid to flow into the swirl chamber (3) at a tangential or preferred angle so as to form a swirl can be configured tangentially or at a preferred angle. The fluid that enters the swirl chamber (3) form a swirling around the channel holder (8) located in the center of the swirl chamber (3). The fluid in the swirl chamber (3) rotates after it enters through the inlet openings (2.1) with pressure and forms a swirl. The fluid is directed to the contracting channel (4) with the swirling formed around the channel holder (8). The speed of the fluid passing from the swirl chamber (3) to the contracting channel (4) increases. The fluid passing into the shrink chamber (4) starts to rotate faster around the central axis of the fluid atomizer (1). When the fluid rotates faster in the contracting channel (4), its pressure decreases. Some of the fluid in the swirl chamber (3) and contracting channel (4) enters the internal outlet channel (6) from the internal outlet channel inlet (6.1). The other part of the fluid coming from the contracting channel (4) by rotating and not directed to the internal outlet channel (6) rotates and enters the external outlet channel (7). The pressure decreases as the fluid rotates in the external outlet channel (7), which is a narrow diameter channel. Air is absorbed into the channels (6, 7) from the external environment since the pressure of the fluid inside the internal outlet channel (6) and the external outlet channel (7) decreases. When the air is absorbed by the external outlet channel (7) and the internal outlet channel (6), a fluid is formed on the external wall of the external outlet channel (7) and an air layer is formed on the inner wall. Air coming from the external environment can be absorbed with the low pressure zone formed at the internal outlet channel inlet (6.1). At the same time, the fluid entering the internal outlet channel (6) through the low pressure zone formed can return and exit from the internal outlet channel owlet (6.2). The fluid which flows by rotating in the internal outlet channel (6) rotates about the central axis of the fluid atomizer (1) and exits through the internal outlet channel outlet (6.2) in the form of inner conical film layer (A) or atomized droplets. The fluid that comes out in the form of a film then atomizes and forms the spray. Similarly, the fluid which flows by rotating in the external outlet channel (7) rotates about the central axis of the fluid atomizer (1) and exits through the channel outlet (7.2) in the form of outer conical film layer (B) or atomized droplets. The fluid that comes out in the form of a film then atomizes and forms the spray. Thus, the fluid is atomized by means of the fluid atomizer (1) and come out in the form of a spray in the form of particles.

What is claimed is:

1. A fluid atomizer wherein the fluid atomizer is configured to atomize a fluid into a spray of droplets, and transform the fluid into a spray dispersion in a form of an intertwined inner conical film and outer conical film layer by atomizing the fluid, and the fluid atomizer comprises the following;

a plurality of inlet channels, wherein the plurality of inlet channels ensure the fluid to be converted into a spray form to enter into a swirl chamber at a tangential or predetermined angle, wherein the swirl chamber creates a swirl and directs the swirling fluid to a contracting channel, wherein the contracting channel is located in a lower part of the swirl chamber and a diameter of the contracting channel is smaller than a diameter of the swirl chamber, and the contracting channel increases a rotation speed and flow rate of the fluid coming from the swirl chamber, at least one flow passage channel, wherein the at least one flow passage channel is located in the contracting channel, enables the fluid coming from the swirl chamber and the contracting channel to be divided and transferred to at least one internal outlet channel and at least one external outlet channel, wherein the at least one internal outlet channel extends downwards starting from an inner section of the contracting channel, passes a part of the fluid coming from the flow passage channel by being divided to an external environment by passing through the swirl chamber or through the contracting channel and to the external environment and simultaneously enables the fluid to be transferred to the external environment by absorbing an air coming from the external environment in a form of a spray in the form of the inner conical film layer, wherein the at least one external outlet channel extends downwards starting from the inner section of the contracting channel, has a diameter different from a diameter of the at least one internal outlet channel, transfers a part of the fluid coming from the flow passage channel to the external environment by passing through the swirl chamber or through the contracting channel and simultaneously provides a discharge of the fluid to be transferred to the external environment by absorbing the air coming from the external environment in a form of a spray in the form of the outer conical film layer, at least one channel holder, wherein the at least one channel holder is located vertically along a central axis of the swirl chamber and extends continuously from an uppermost surface of the swirl chamber downward through the contracting channel, ensures that the flow passage channel and the internal outlet channel are kept on the center axis of the swirl chamber and the contracting channel;

wherein the plurality of inlet channels is connected to the swirl chamber, the swirl chamber comprises inlet openings, the inlet openings are located in a part where the inlet channels meet with the swirl chamber, wherein the flow passage channel is formed between the channel holder and the at least one internal outlet channel and the at least one external outlet channel within the contracting channel;

wherein the inlet openings are configured to be connected to the swirl chamber, provides the fluid entering through the plurality of inlet channels to enter the swirl chamber at a tangential or predetermined angle;

wherein the swirl chamber is in a cylindrical geometric form, has the plurality of inlet channels at a first end of a cylindrical surface and the contracting channel at a second end of the cylindrical surface, to the swirl chamber the fluid entering the plurality of inlet channels with a high pressure enters therein by passing through the inlet openings;

wherein the swirl chamber has the channel holder on the central axis of the swirl chamber on the contracting channel;

wherein the swirl chamber enables the fluid entering the inlet openings with a high pressure to create a swirling around the channel holder due to the inlet openings being at a tangential or predetermined angle;

wherein the contracting channel is in a conical geometric form, increases the speed of the fluid making a swirling movement in the swirl chamber during a passage of the swirl chamber to the contracting channel;

wherein the contracting channel increases the rotation speed of the fluid passing through the swirl chamber around the central axis of the swirl chamber, provides a decrease in the pressure of the fluid passing through the swirl chamber with a high pressure in a swirling flow characteristic.

2. The fluid atomizer according to claim 1, wherein the flow passage channel is located between the channel holder and the at least one internal outlet channel and the at least one external outlet channel inside the contracting channel, enables the fluid with a high rotation and flow velocity at a low pressure in the contracting channel to pass from the contracting channel by dividing the fluid into the at least one internal outlet channel and the at least one external outlet channel of a small diameter.

3. The fluid atomizer according to claim 1, wherein the at least one internal outlet channel comprises an internal outlet channel inlet and an internal outlet channel outlet, is at a bottom of the contracting channel and in a cylindrical form, increases flow and rotation speeds of the fluid by extending upwards from an interior of the channel holder and towards an interior of the swirl chamber.

4. The fluid atomizer according to claim 1, wherein in the at least one internal outlet channel, while an internal outlet channel inlet opens to the flow passage channel an internal outlet channel outlet opens to the external environment or to an operating system a fuel system and an exhaust system, wherein the internal outlet channel outlet can be connected to the operating system.

5. The fluid atomizer according to claim 1, wherein in the at least one internal outlet channel, while the fluid coming from an internal outlet channel inlet and the contracting channel enters, the air enters from the external environment through an internal outlet channel outlet.

6. The fluid atomizer according to claim 1, wherein the at least one internal outlet channel provides that the fluid coming from the contracting channel with a swirling characteristic is directed to the external environment without disturbing the swirling characteristic.

7. The fluid atomizer according to claim 1, wherein the at least one internal outlet channel is connected to the contracting channel by the flow passage channel at a first end and a second end, and the at least one internal outlet channel opens to the external environment and is connected in the contracting channel through the flow passage channel from an internal outlet channel inlet.

8. The fluid atomizer according to claim 1, wherein the at least one internal outlet channel provides the fluid with a swirling characteristic entering from an internal outlet channel inlet to rotate and move towards an internal outlet channel outlet.

9. The fluid atomizer according to claim 1, wherein the at least one internal outlet channel has a smaller diameter than the contracting channel and reduces the pressure of the entering fluid.

10. The fluid atomizer according to claim 1, wherein the at least one internal outlet channel provides an absorption of the air coming from an internal outlet channel outlet with the decrease of the pressure of the incoming fluid.

11. The fluid atomizer according to claim 1, wherein the at least one internal outlet channel forms a fluid layer on an outer wall of the at least one internal outlet channel and forms an air layer on an inner wall with an absorption of the air coming from the external environment due to a low pressure of the fluid with a swirling characteristic entering from an internal outlet channel inlet.

12. The fluid atomizer according to claim 1, wherein the at least one external outlet channel comprises an external outlet channel inlet and an external outlet channel outlet, increases flow and rotation speeds of the fluid by extending upwards from an interior of the channel holder and towards an interior of the swirl chamber.

13. The fluid atomizer according to claim 1, wherein the at least one external outlet channel is located to encircle the at least one internal outlet channel, has a diameter larger than the diameter of the at least one internal outlet channel and is coincident with a central axis of the at least one internal outlet channel.

14. The fluid atomizer according to claim 1, wherein in the at least one external outlet channel, while an external outlet channel inlet opens to the flow passage channel similar to an internal outlet channel inlet, an external outlet channel outlet opens to the external environment or to an operating system a fuel system and an exhaust system where the external outlet channel outlet can be connected, similar to the internal outlet channel inlet.

15. The fluid atomizer according to claim 1, wherein in the at least one external outlet channel, while the fluid coming from an external outlet channel inlet enters through the contracting channel, the air enters from the external environment through an external outlet channel outlet.

16. The fluid atomizer according to claim 1, wherein the at least one external outlet channel provides that the fluid coming from the contracting channel with a swirling characteristic is directed to the external environment without disturbing the swirling characteristic.

17. The fluid atomizer according to claim 1, wherein the at least one external outlet channel provides the fluid coming from the contracting channel to be divided in the flow passage channel and the at least one external outlet channel.

18. The fluid atomizer according to claim 1, wherein the at least one external outlet channel has a smaller diameter than the contracting channel, decreases the pressure of the incoming fluid and provides the fluid with a swirling characteristic entering from an external outlet channel inlet to rotate and move towards an external outlet channel outlet.

19. The fluid atomizer according to claim 1, wherein the at least one external outlet channel provides an absorption of the air coming from an external outlet channel outlet with the decrease in the pressure of the incoming fluid, decreases the pressure of the fluid entering through an external outlet channel inlet with a swirling characteristic and forms a fluid on an outer wall of the at least one external outlet channel and an air layer on an inner wall by absorbing the air coming from the external environment.

20. The fluid atomizer according to claim 1, wherein the channel holder is located in an upper part of the flow passage channel inside the swirl chamber, provides the flow passage channel to remain in a fixed position within the contracting channel on the at least one internal outlet channel and the at least one external outlet channel and provides the flow passage channel to remain on the same center together with the at least one internal outlet channel and the at least one external outlet channel.

* * * * *